(12) United States Patent
Leimkuehler et al.

(10) Patent No.: US 7,600,525 B2
(45) Date of Patent: Oct. 13, 2009

(54) LEAK DETECTION AND ISOLATION FOR SEGMENTED INFLATABLE STRUCTURES

(75) Inventors: Thomas O. Leimkuehler, League City, TX (US); Vipul P. Patel, Irvine, CA (US); Patrick J. Hughes, Bellflower, CA (US)

(73) Assignee: Honeywell International Inc., Morristown, NJ (US)

( * ) Notice: Subject to any disclaimer, the term of this patent is extended or adjusted under 35 U.S.C. 154(b) by 594 days.

(21) Appl. No.: 11/227,694

(22) Filed: Sep. 14, 2005

(65) Prior Publication Data

US 2007/0056638 A1    Mar. 15, 2007

(51) Int. Cl.
*F16K 37/00* (2006.01)
(52) U.S. Cl. .................. 137/12; 137/557; 137/843; 137/859
(58) Field of Classification Search .......... 137/557, 137/511, 843, 859, 12
See application file for complete search history.

(56) References Cited

U.S. PATENT DOCUMENTS

| 3,144,219 | A | 8/1964 | Schnitzer |
| 3,169,725 | A | 2/1965 | Berglund |
| 3,310,256 | A * | 3/1967 | Webb ................. 244/159.2 |
| 3,348,352 | A | 10/1967 | Cummings |
| 4,529,054 | A * | 7/1985 | Tattersall ................. 180/118 |
| 4,730,797 | A | 3/1988 | Minovitch |
| 4,744,533 | A | 5/1988 | Mullen |
| 5,086,999 | A | 2/1992 | Mullen |
| 6,231,010 | B1 | 5/2001 | Schneider et al. |
| 6,439,508 | B1 | 8/2002 | Taylor |
| 6,547,189 | B1 | 4/2003 | Raboin et al. |

OTHER PUBLICATIONS

Zak, Anatoly "Cosmonaut's Flight Plan: Find the Leak on Mir" posted Mar. 31, 2000; http://www.space.com/missionlaunches/launches/mir_flight_plan_000331.html.
Zak, Anatoly; "Mir Leaking Air" posted Oct. 14, 1999; http://www.space.com/news/spacestation/mir_leak_991014.html.

* cited by examiner

*Primary Examiner*—Kevin L Lee
(74) *Attorney, Agent, or Firm*—Oral Caglar, Esq.

(57) ABSTRACT

Space vehicles such as space stations are often constructed as segmented inflatable structures which are susceptible to being punctured by small meteoric materials, resulting in small insidious leaks which are difficult to locate and repair. A method and apparatus are described in which a differential pressure transducer is positioned between segments of the space vehicle. Atmospheric gas pressure of all segments is continuously monitored. Analysis is performed on any pressure differentials which are determined to exist between adjacent segments. Detection of small leaks initiates an automatic isolation of the leaking segment. Detection of catastrophic leaks initiates an emergency evacuation of personnel from the affected segment.

25 Claims, 6 Drawing Sheets

LEAK DETECTION AND ISOLATION FOR SEGMENTED INFLATABLE STRUCTURES

BACKGROUND OF THE INVENTION

This invention generally relates to methods and apparatus for reliably detecting leaks in exterior walls of a segmented space station or vehicle. More particularly the invention relates to rapidly identifying a segment in which a leak has developed and isolating the affected segment from other segments of the vehicle.

Exploration of space is being carried out with vehicles which are inflatable structures. These vehicles are carried into an orbiting location in space in a deflated state. After reaching an orbital location, the vehicle is inflated into an enlarged configuration. Typically, these inflatable structures employ flexible materials as their outer walls. Flexible wall materials are susceptible to damage from meteoric particles. Consequently, there is a need to anticipate air leaks and provide a system to locate and repair such leaks in these vehicles.

In the prior art, manned vehicles such as the former Russian space station Mir, and the International Space Station, were constructed as a collection of segments which could be isolated from one another so that adverse effects of detected leakage could be isolated from a remainder of the vehicle. But leak detection is extra challenging for segmented manned space structures. The presence of multiple segments that are all attached and open to each other requires not only detecting the presence of a leak, but also identifying the location of the leak, i.e., in which segment the leak is occurring.

Large leaks are easily detected by monitoring cabin pressure and watching for rapid changes in that cabin pressure. Small leaks, while not presenting as immediate of a danger to crew life as large leaks, still are of grave concern and require detection, isolation, and repair in a timely manner. Even though the leak may be in only one segment, the pressure in all the segments decreases since the segments are all open to each other. As air rushes out of the leaking segment, air from neighboring segments rushes in to replace the lost air. The result is a decreasing cabin pressure in all segments. In the prior art, such small leaks in segmented space structures are detected by closing off and isolating each individual segment, one by one. The segments must be hermetically sealed from one another. If the pressure in the non-isolated segments holds steady while the pressure in the isolated segment continues to decrease, then the leak has been determined to be in the isolated segment. However, for slow leaks in a vehicle having multiple connected segments, identification of the location of the leaks in this manner can be a very time consuming process. Analysis of any one segment may require work effort that extends over a period of 48 hours or more. In a multi-segmented structure, identification and repair of a leak may require hundreds of hours of work effort. Throughout this extended time, atmospheric gas continues to escape from the vehicle.

As can be seen, there is a need for simple and accurate method and apparatus for discerning the presence of a leak in any particular segment of an inflatable manned space vehicle. Additionally, it is important that such a system can rapidly produce leak location information. It is also important that such a system have a capability for detecting small leaks.

SUMMARY OF THE INVENTION

In one aspect of the present invention an inflatable space vehicle comprises a first segment and a second segment adjacent to the first segment, each of the segments having an atmospheric gas therein, a differential pressure transducer adapted to monitor a differential in an atmospheric gas pressure in the first segment and an atmospheric gas pressure in the second segment, and an isolation barrier adapted to isolate the first segment from the second segment and thereby preclude flow of the atmospheric gas between the first segment and the second segment, the isolation barrier being in an open position in the absence of the differential. The isolation barrier is adapted to automatically close in the presence the differential.

In another aspect of the present invention an apparatus for mitigating atmospheric gas leakage from a segmented space vehicle comprises a differential pressure transducer positioned so that a first sensor of the transducer is adapted to sense atmospheric gas pressure in a first segment of the vehicle and a second sensor of the differential pressure transducer is adapted to sense atmospheric gas pressure in a second segment, a control panel adapted to continuously monitor pressure differential between the first and second segments, and an isolation barrier adapted to prevent gas flow between the first and the second segment. The isolation barrier is adapted to close when a differential is detected between atmospheric gas pressure in the first segment and atmospheric gas pressure in the second segment.

In still another aspect of the present invention a method for mitigating leakage of atmospheric gas from segmented manned space vehicles comprises the steps of continuously monitoring atmospheric gas pressure differential between a first and a second segment of the vehicle, closing an isolation barrier between the first segment and second segment to preclude atmospheric gas flow therebetween and to produce an isolated segment when said atmospheric gas pressure differential is detected, analyzing the atmospheric gas pressure differential to determine if the differential increases over time, producing a warning signal if such a determination is made, and opening the isolation barrier after the warning signal is produced so that any personnel in the isolated segment may exit said segment.

In yet another aspect of the present invention a method for mitigating atmospheric gas leakage in segmented manned space vehicles comprises the steps of positioning a differential pressure transducer so that a first sensor of the transducer is adapted to sense atmospheric gas pressure in a first segment of the vehicle and a second sensor of the differential pressure transducer is adapted to sense atmospheric gas pressure in a second segment, continuously monitoring atmospheric gas pressure differential between the first and second segments, and isolating the first segment from the second segment when a differential is detected between atmospheric gas pressure in the first segment and atmospheric gas pressure in the second segment.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention may be useful in mitigating adverse effects of leakage in inflatable segmented structures. In that regard the invention is particularly useful for leak detection in segmented inflatable manned space vehicles. For illustrative purposes, the following description includes an example of the inventive apparatus and method that may be employed in detecting and initiating corrective measures to control leakage of atmospheric gas from a space vehicle. However, it is understood that other applications can be substituted for the inventive leak mitigation methods and apparatus.

In the prior art, small leaks in inflatable segmented space vehicles were not immediately detected. Their presence typically became known only after a general reduction of pressure was observed throughout the entire space vehicle. In these instances, atmospheric gas pressures among all of the segments would become equalized and identification of a leaking segment became difficult. The present invention may provide accurate and timely information about the presence of a leak in any segment of a multi-segment space vehicle. When this timely information is provided, a leaking segment may be quickly isolated from other segments of the vehicle. Timely leak information may be provided by continuously monitoring differential atmospheric pressure between adjacent segments of the vehicle. Detection of a pressure differential may begin a sequence of events in which a potentially leaking segment may be quickly isolated. An initial isolation of the segments may produce a condition in which an existence of a leak may be confirmed. An increasing differential in pressure may be indicative of a confirmed leak. Absence of change in differential pressure may be indicative of an anomaly that is not a leak.

The present invention may overcome a need to perform exhaustive and time-consuming manual leak detection work on manned space vehicles. The inventive technique may be particularly effective because leaks may be detected quickly and air loss associated with those leaks may be substantially reduced.

Figure 1:
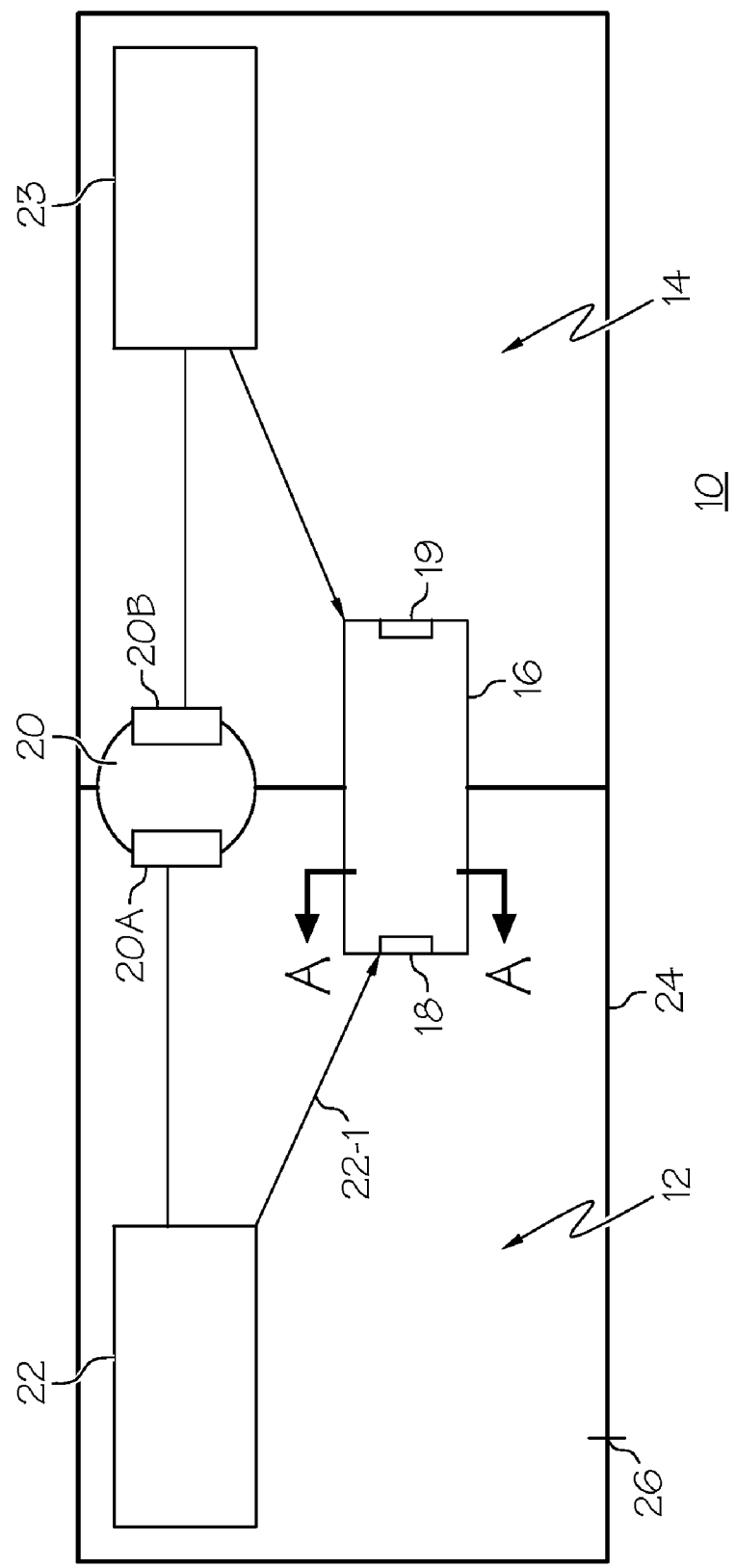
FIG. 1 is a schematic illustration of a portion of a segmented space vehicle which may embody the present invention.

Referring now to FIG. 1, a portion of a space vehicle, designated by the numeral 10, is shown schematically. The space vehicle 10 may be comprised of a plurality of segments. By way of example, two of these segments are illustrated in FIG. 1. A first segment 12 and a second segment 14 are shown in an adjacent relationship. A normally-open airlock 16 may be interposed between the first segment 12 and second segment 14. The airlock 16 may be provided with a first isolation barrier 18 and a second isolation barrier 19. The space vehicle 10 may comprise a differential pressure transducer 20 interposed between the first segment 12 and the second segment 14. The differential pressure transducer may be provided with a first sensor 20A and a second sensor 20B. The first sensor 20A may be adapted to sense atmospheric gas pressure in the first segment 12. The second sensor 20B may be adapted to sense atmospheric gas pressure in the second segment 14. The first segment 12 may be provided with a first control panel 22. The second segment 14 may be provided with a second control panel 23.

For purposes of illustration, an outer wall 24 of the first segment 12 is shown to have a leak location 26. Additionally, for purposes of illustrating the efficacy of the present invention, the air lock 16 may be in an open position to allow for ease of movement of personnel between the segment 12 and the segment 14.

Figure 1B:
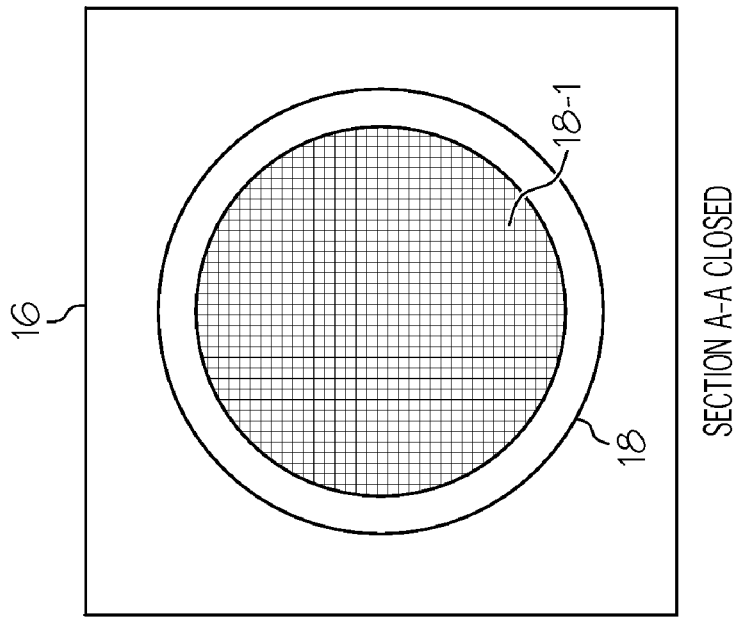
FIG. 1B is a sectional view taken along the lines A-A of FIG. 1 showing a closed isolation barrier in accordance with the present invention.
Figure 1A:
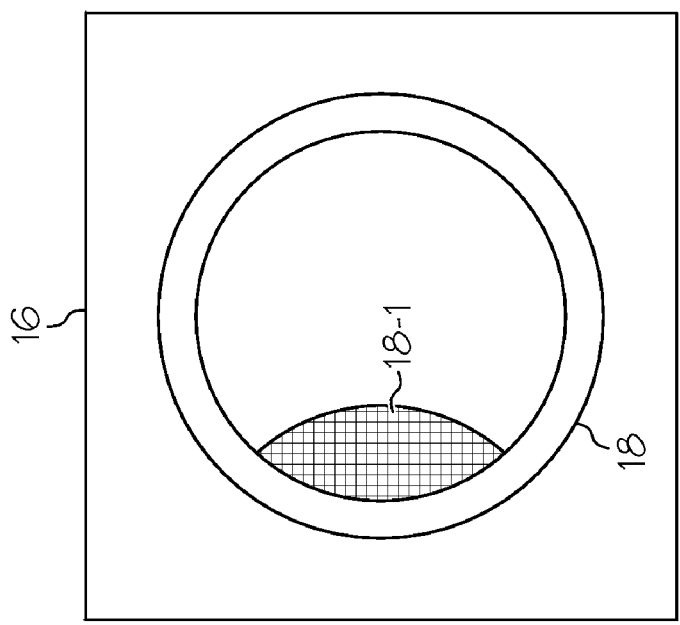
FIG. 1A is a sectional view taken along the lines A-A of FIG. 1 showing an open isolation barrier in accordance with the present invention.

In operation, the apparatus shown in FIG. 1 may perform a leak mitigation function in the presence of a loss of atmospheric gas at the leak location 26. Atmospheric gas, i.e., gas required for life support, may begin to flow out of the space vehicle 10 at the leak location 26 in the first segment 12. This outward flow of atmospheric gas may produce an overall change in pressure within the space vehicle 10. But, the flow of atmospheric gas may produce, within the first segment 12, a slightly greater change in pressure than that which develops throughout the space vehicle 10. The differential pressure transducer 20 may detect a differential between a first atmospheric pressure in the first segment 12 as compared to a second atmospheric pressure in the second segment 14. When a differential is detected between the first and the second atmospheric pressures, the differential pressure transducer 20 may produce a pressure differential signal that may be conveyed to the first control panel 22 in the first segment 12. The first control panel 22 may in turn produce a closure signal 22-1 that may be conveyed to the first isolation barrier 18 in the first segment 12, which isolation barrier 18 may be in an open state as shown in FIG. 1A Responsively to the closure signal 22-1, a closure member 18-1 of the first isolation barrier 18 may close, as shown in FIG. 1B; thereby isolating the first segment 12 and precluding any further flow of atmospheric gas from the second segment 14 into the first segment 12.

When flow of atmospheric gas into the first segment 12 is blocked by closure of the first isolation barrier 18, atmospheric gas pressure in the first segment 12 may begin to change at a rate that may be more rapid than the change of pressure detected prior to closure of the first isolation barrier 18. This more rapid rate of change of atmospheric pressure may occur because the overall mass of atmospheric gas in the first segment 12 may diminish. An increase in rate of change of atmospheric pressure within the first segment 12 may provide confirmation that a leak within the outer wall 24 of first segment 12.

If, on the other hand, the pressure in the first segment 12 remains substantially unchanged after closure of the first isolation barrier 18, the differential pressure transducer 20 may provide a false-alarm signal to the first control panel 22 which in turn provides a opening signal to the first isolation barrier 18 which may cause the first isolation barrier 18 to open.

Figure 2:
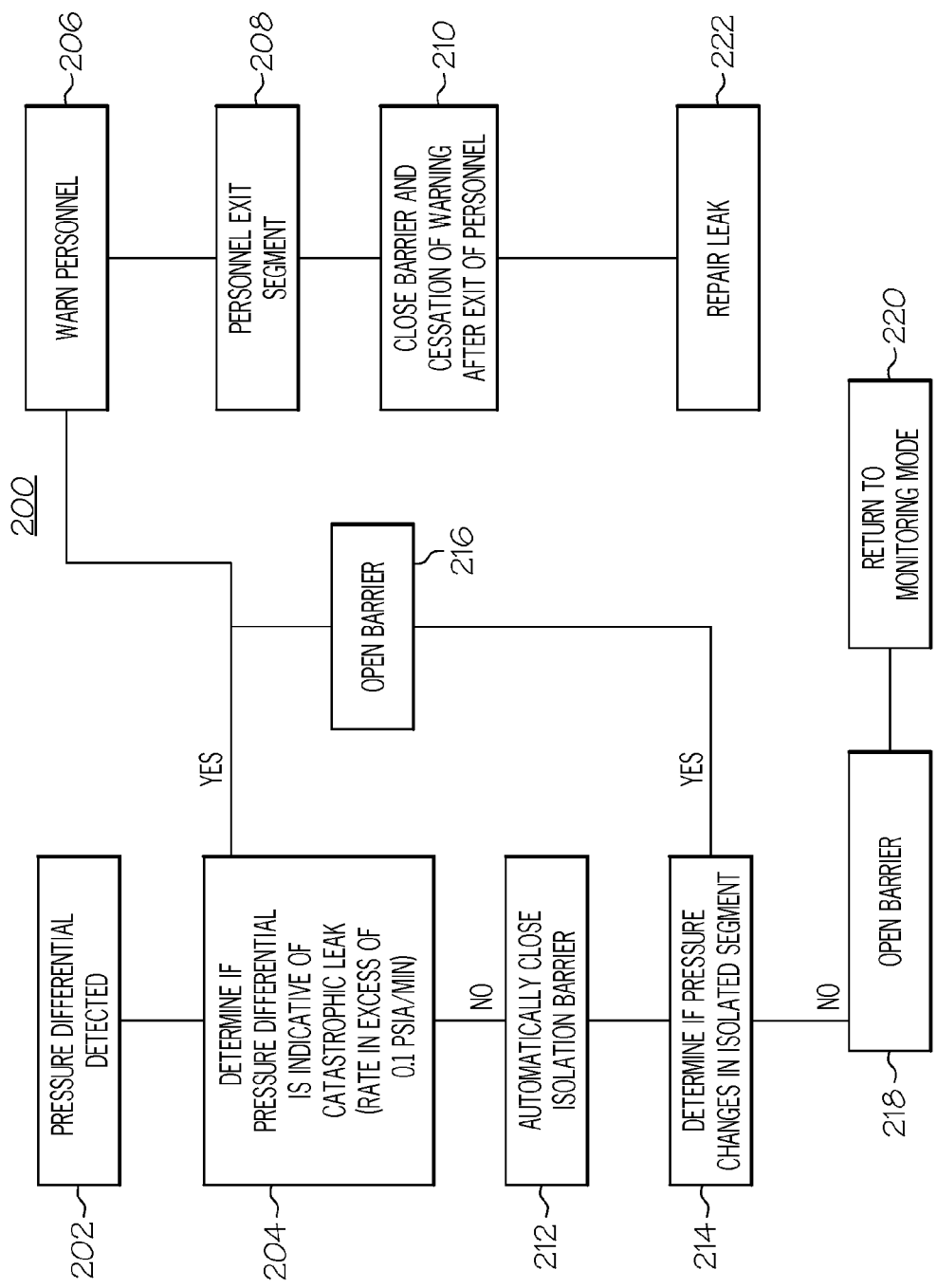
FIG. 2 is a schematic illustration that displays a series of steps that comprises a method for mitigating adverse effects of space vehicle leaks in accordance with the present invention.

Referring now to FIG. 2, a schematic diagram illustrates a sequence of events that may be associated with detection of a potential leak in the first segment 12 according to one embodiment of a method 200 of the present invention. In a step 202 a pressure differential may be detected by the differential pressure transducer 20 of FIG. 1. In a step 204 a pressure differential signal from the differential pressure transducer 20 may be analyzed within the first control panel 22 of FIG. 1. If a detected pressure differential is deemed to be large and indicative of a catastrophic leak, a warning signal may be produced in a step 206. In this event, any personnel who are present in the leaking first segment 12 may quickly leave that segment in a step 208. In a step 210, the first isolation barrier 18 may be closed after all personnel have exited the leaking first segment 12. Cessation of the warning signal by the exiting personnel also may occur in the step 210. By way of example, a catastrophic leak may be one that produces a pressure differential of about 0.1 psia or more in a time period of about one minute or less. In other words, a catastrophic leak may be deemed to exist when a rate of increase in pressure differential exceeds about 0.1 psia in about one minute or less.

If the analysis of step 204 determines that a potential leak is not catastrophic, then a different series of events may be implemented (e.g., steps 212-220). In this case, in a step 212, the first isolation barrier 18 may be closed in response to a closure signal from the first control panel 22. Thus, in the event of a small leak, i.e., a non-catastrophic leak, the first isolation barrier 18 may be automatically closed without an intervening evacuation of personnel. In other words, closure may occur quickly within a time less than about four minutes.

After closure of the isolation barrier 18 in step 212, the differential pressure transducer 20 and the control panel 22 may begin to determine, in a step 214, if atmospheric gas pressure is changing in the first segment 12 at a rate different from that of the adjacent second segment 14. If such a rate of change is indicative of a leak, then in a step 216, the isolation barrier 18 may be opened, and the sequence of steps 206 through 210 may be initiated. Evacuation of personnel may proceed in a step 208 and the first segment 12 may be isolated until a leak repair plan may be implemented in a step 222.

If, on the other hand, the analysis of step 214 fails to confirm that a leak exists in the isolated first segment 12, i.e., pressure change rate may be below a predetermined value, then in a step 218, the first isolation barrier 18 may be opened and the differential pressure transducer 20 may return to a monitoring mode in a step 220 without any evacuation of personnel from the first segment 12. In other words, the present invention advantageously provides for a rapid analysis of virtually any minor pressure differential to be performed without disrupting normal activities of personnel in the space vehicle 10.

The series of steps shown in FIG. 2 provides an efficient and effective method 200 for continuously determining whether or not any segment of the space vehicle 10 has developed a leak. When the method 200 is employed, there may never be a need to perform the arduous segment by segment isolation and leak checking that has been required in prior art leak location methods.

The method of monitoring for leaks of the present invention as discussed above may be seen to be particularly useful when consideration is given to the difficulty of detecting small leaks in segmented space vehicles. These difficulties can be better understood by referring to FIG. 3.

Figure 3:
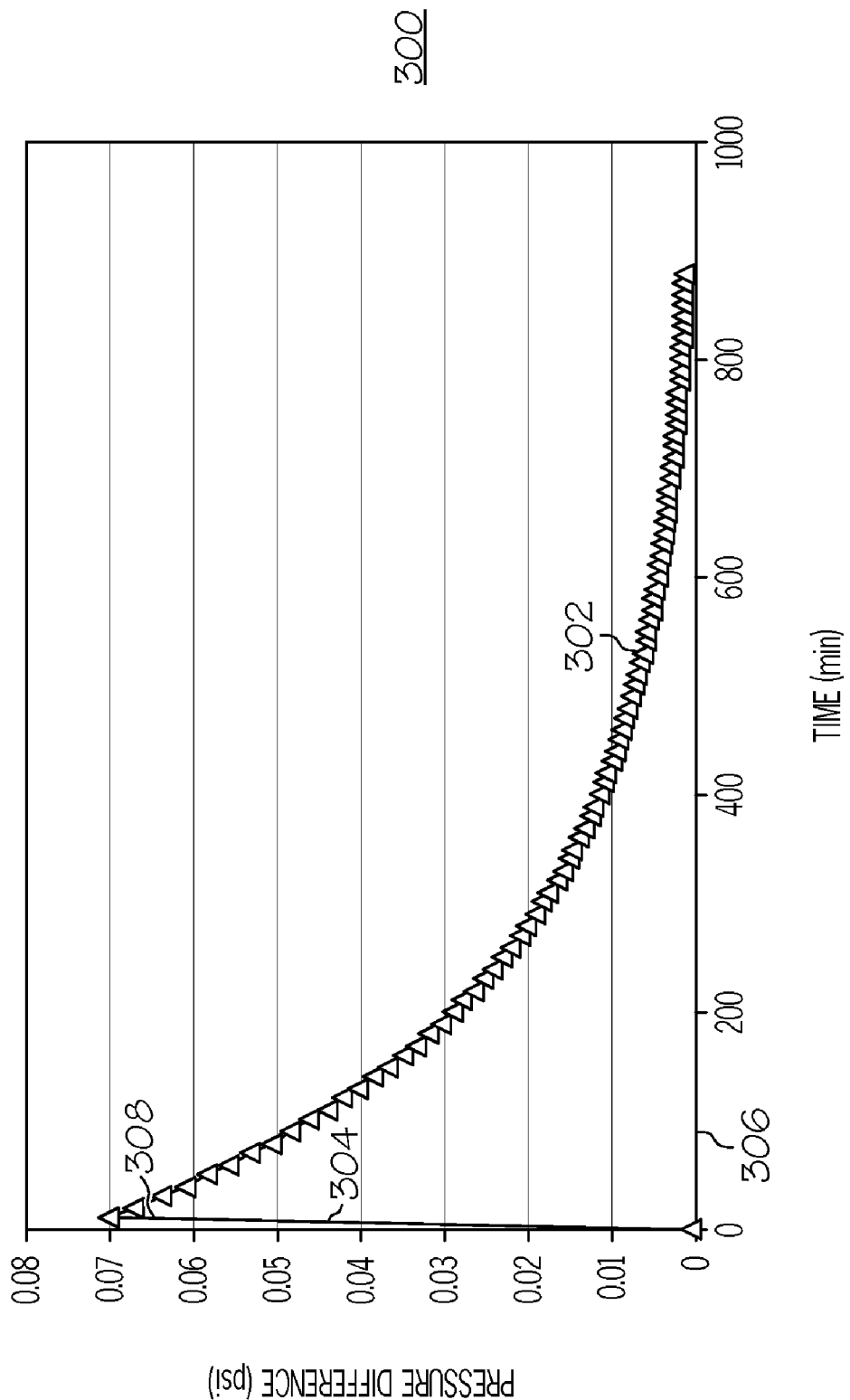
FIG. 3 is a graph that illustrates a relationship between inter-segment pressure differentials and time in the context of a leaking segment.

In FIG. 3, a graph 300 illustrates a relationship that may exist between time and a differential between atmospheric gas pressure in the first segment 12 and atmospheric gas pressure in the second segment 14 in the event of a loss of atmospheric gas at the leak location 26. A graph line 302 may reflect a typical pressure differential/time relationship in a leaking segment of a multi-segmented space vehicle in which atmospheric gas may freely flow between the first and second segments 12 and 14, respectively. An ordinate/y axis 304 of the graph 300 displays pressure differential in a range from zero to 0.08 psia. An abscissa/x axis 306 of the graph 300 displays time in a range between zero and 1000 minutes.

The graph line 302 may display operational characteristics of a typical one of the differential pressure transducers 20 of FIG. 1. The differential pressure transducer 20 may comprise a digital quartz pressure diaphragm (not shown) that may be employed to measure absolute pressure within a vehicle located in space, wherein one side of the diaphragm may be referenced to a standard or reference pressure value, while cabin pressure, or other pressure to be measured, may be applied to the other side of the diaphragm. In an exemplary embodiment of the present invention, a first side of the diaphragm of the differential pressure transducer 20, which first side may comprise the sensor 20A, may be exposed to the atmosphere of the first segment 12, and a second opposite side of the diaphragm, which second side may comprise the sensor 20B, may be exposed to the atmosphere of the second segment 14.

The graph 300 portrays a condition in which a small leak may have developed in the outer wall 24 of the first segment 12. The graph line 302 may have a sharp spike 308. The spike 308 may represent a phenomenon which may occur when the first segment 12 begins to leak. A pressure differential of about 0.07 psia may develop during a short period of time. This short period of time typically may be between about 4 to 10 minutes. After the spike 308 develops, the pressure differential may begin to diminish exponentially. After a time of about 800 minutes, the pressure differential may be substantially undetectable.

Figure 4:
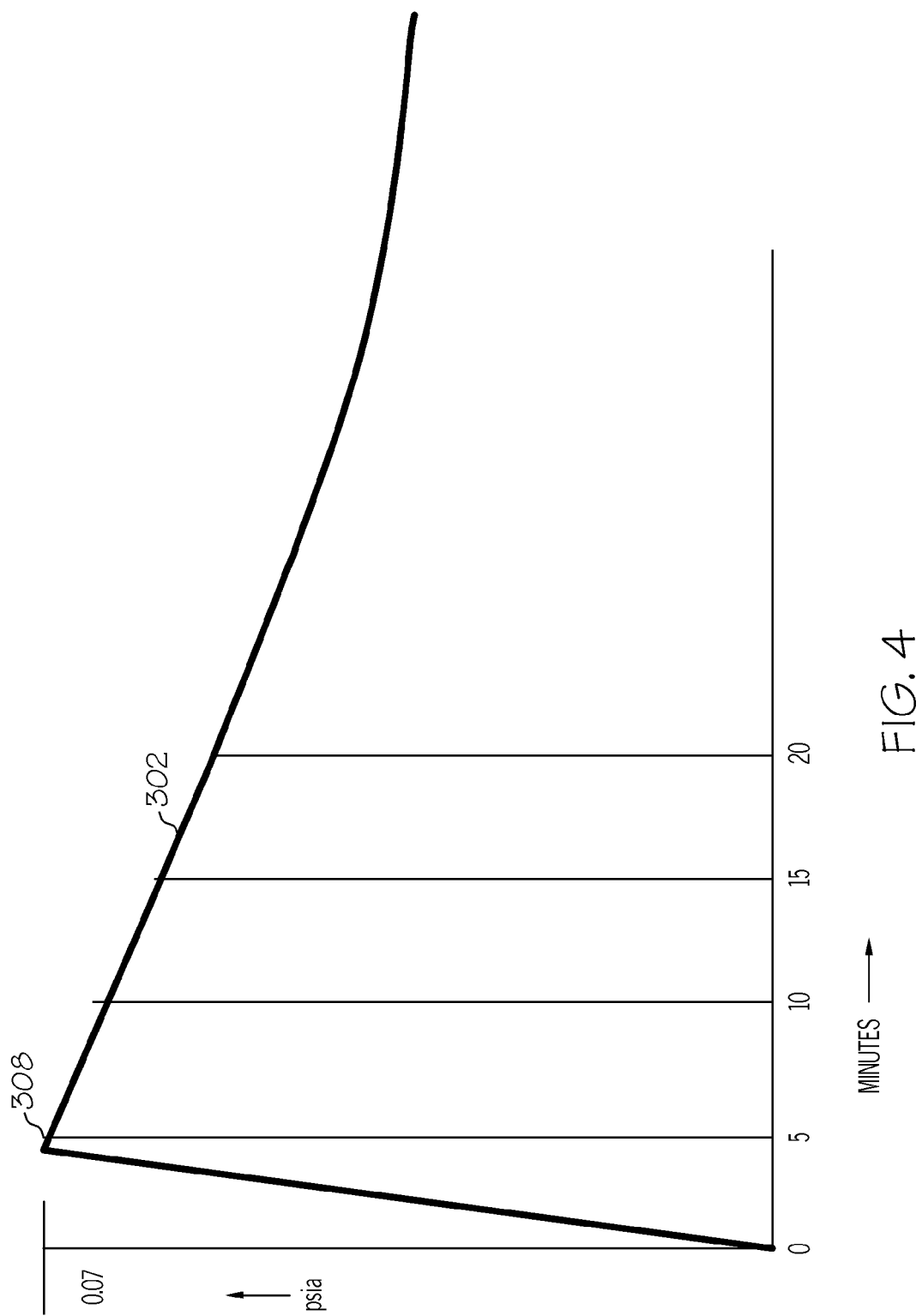
FIG. 4 is a graph that shows a time-expanded portion of the graph of FIG. 3.

FIG. 4 shows the spike 308 of the graph line 302 in a time-expanded format. FIG. 4 more readily illustrates that the spike 308 may develop within about a first 10 minutes of existence of a differential between the atmospheric gas pressure in the first segment 12 and the atmospheric gas pressure in the second segment 14. The graph line 302 of FIGS. 3 and 4 illustrates the value of performing an analysis of a potentially leaking condition in the very early stages of detection of such a pressure differential. It may be desirable to produce an isolation of the leaking segment while the pressure differential is high enough to be readily detectable. Typical differential pressure transducers have a limited sensitivity. They function well when measuring pressure differences that are least as large as about 0.2 to about 0.4 psia. Pressure differences which are readily detectable typically occur in a very early stage of a leaking condition. Consequently, quick action produces the most accurate and useful analytical results.

Figure 5:
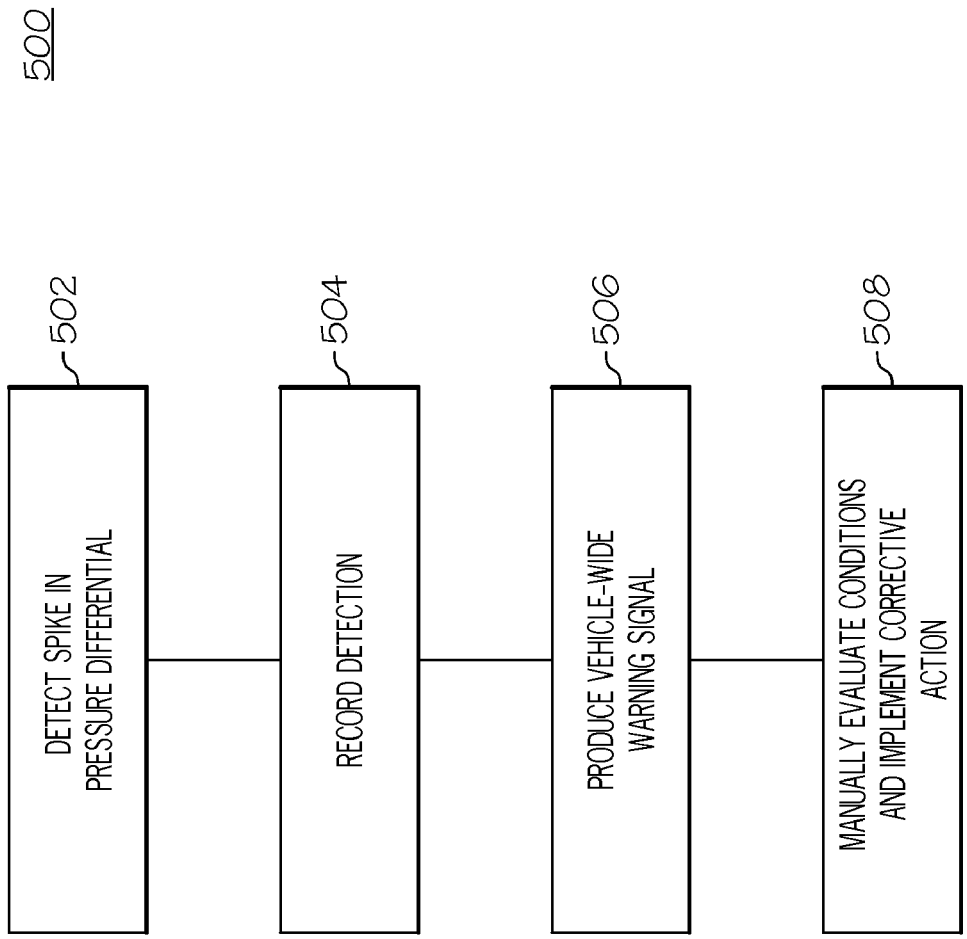
FIG. 5 is a schematic illustration that displays a series of steps that comprises a method for mitigating adverse effects of space vehicle leaks in accordance with the present invention.

Referring now to FIG. 5, it may be seen that rapid acquisition of information relating to possible leakage may be used to initiate a series of steps of a method 500 which may be implemented in one of the space vehicles 10 even if the isolation barriers 18 and 19 are not adapted to respond automatically to closure signals from the control panels 22 and 23. In a step 502, the spike 308 of FIG. 3 may be detected by the differential pressure transducer 20 of FIG. 1. In a step 504, this detection may be recorded in either of the control panels 22 or 23 of FIG. 1. In a step 506, a warning signal may be generated. As a non-limiting example, the warning signal generated in the step 506 may be an audible signal. The warning signal generated in the step 506 may be detectable or sensed by crew members/vehicle personnel throughout the entire space vehicle 10. In a step 508, a manual evaluation of conditions may be performed by personnel in the space vehicle 10, and corrective action such as manual isolation of the affected segment and analysis and/or repair of a leak may be implemented.

The methods and apparatus described above may be particularly useful in mitigation of adverse effects of small leaks in segmented space vehicles. Nevertheless, the present inventions may also have utility in the context of mitigating the effects of large or catastrophic leaks. In the case of large leaks a warning signal such as that of step 206 in FIG. 2 may be produced whenever a pressure differential greater than about 0.1 psia develops in a time period less than about one minute.

It should be understood, of course, that the foregoing relates to exemplary embodiments of the invention and that modifications may be made without departing from the spirit and scope of the invention as set forth in the following claims.

We claim:

1. An inflatable space vehicle comprising:
   a first segment and a second segment adjacent to the first segment, each of the segments having an atmospheric gas therein;
   a differential pressure transducer adapted to monitor a differential in an atmospheric gas pressure in the first segment and an atmospheric gas pressure in the second segment;
   an isolation barrier adapted to isolate the first segment from the second segment and thereby preclude flow of the atmospheric gas between the first segment and the second segment;
   the isolation barrier being in an open position in the absence of the differential; and
   the isolation barrier being adapted to automatically close in the presence of the differential.

2. The inflatable space vehicle of claim 1 wherein the differential pressure transducer comprises a diaphragm with a first side thereof exposed to the atmospheric gas of the first segment and a second side thereof exposed to the atmospheric gas of the second segment.

3. The inflatable space vehicle of claim 2 wherein the differential pressure transducer comprises a digital quartz diaphragm and has a sensitivity that is as great as about 0.01 psia over a range of about 0 to 20 psia.

4. The inflatable space vehicle of claim 1 further comprising:
   a control panel adapted to produce a vehicle-wide warning signal when the differential rises to an excess of 0.1 psia during a period of time that is less than about one minute; and
   wherein the isolation barrier is adapted to remain open until cessation of the warning signal.

5. The inflatable space vehicle of claim 4 wherein the isolation barrier is adapted to automatically close within a period of time that is between about 4 and about 10 minutes after the differential exceeds about 0.04 psia and said differential has increased at a rate that does not exceed 0.1 psia per minute.

6. Apparatus for mitigating atmospheric gas leakage from a segmented space vehicle comprising:
   a differential pressure transducer positioned so that a first sensor of the transducer is adapted to sense atmospheric gas pressure in a first segment of the vehicle and a second sensor of the differential pressure transducer is adapted to sense atmospheric gas pressure in a second segment;
   a control panel adapted to continuously monitor pressure differential between the first and second segments;
   an isolation barrier adapted to prevent gas flow between the first and the second segment;
   the isolation barrier being adapted to close when a differential is detected between atmospheric gas pressure in the first segment and atmospheric gas pressure in the second segment.

7. The apparatus of claim 6 wherein the differential pressure transducer comprises a digital quartz pressure diaphragm.

8. The apparatus of claim 6 wherein the differential pressure transducer has sensitivity that is as great as about 0.01 psia over a range of about 0 to 20 psia.

9. The apparatus of claim 6 wherein the isolation barrier closes when the detected differential is between about 0.04 psia and 0.08 psia.

10. The apparatus of claim 6 wherein the control panel produces a vehicle-wide warning signal when the detected differential rises to an excess of 0.1 psia during a period of time that is less than about one minute.

11. The apparatus of claim 6 wherein the isolation barrier is adapted to close within a period of time that is between about 4 and about 10 minutes after the detected differential exceeds about 0.04 psia.

12. The apparatus of claim 6 wherein:
   the control panel is adapted to produce a vehicle-wide warning signal when the detected pressure differential rises to an excess of 0.1 psia during a period of time that is less than about one minute;
   the isolation barrier is adapted to remain open during production of the vehicle-wide warning signal; and
   the isolation barrier is adapted to close in response to a cessation of the warning signal.

13. The apparatus of claim 12 wherein the isolation barrier is adapted to close within a period of time that is between about 4 and about 10 minutes after the detected pressure differential exceeds about 0.04 psia.

14. A method for mitigating leakage of atmospheric gas from segmented manned space vehicles comprising the steps of:
   continuously monitoring atmospheric gas pressure differential between a first and a second segment of the vehicle;
   closing an isolation barrier between the first segment and second segment to preclude atmospheric gas flow therebetween and to produce an isolated segment when said atmospheric gas pressure differential is detected;
   analyzing the atmospheric gas pressure differential to determine if the differential increases over time;
   producing a warning signal if such a determination is made; and
   opening the isolation barrier after the warning signal is produced so that any personnel in the isolated segment may exit said segment.

15. The method of claim 14 which comprises the further step of a re-closing the isolation barrier after a determination is made that no personnel are in the leaking segment.

16. The method of claim 14 wherein the step of closing the isolation barrier is performed after determination that the atmospheric gas pressure differential is between about 0.04 and about 0.08 psia.

17. The method of claim 16 wherein the isolation barrier is closed within about 4 to about 10 minutes after detection of the atmospheric gas pressure differential.

18. The method of claim 14 wherein the detected atmospheric gas pressure differential is determined to be higher than about 0.10 psia within about one minute after detection thereof, which method comprises the further steps of:
   producing a warning signal; and
   the step of closing the isolation barrier is performed only after all personnel have been evacuated from the segment in which reduced atmospheric gas pressure is detected.

19. A method for mitigating atmospheric gas leakage in segmented manned space vehicles comprising the steps of:

positioning a differential pressure transducer so that a first sensor of the transducer is adapted to sense atmospheric gas pressure in a first segment of the vehicle and a second sensor of the differential pressure transducer is adapted to sense atmospheric gas pressure in a second segment;

continuously monitoring atmospheric gas pressure differential between the first and second segments; and isolating the first segment from the second segment when a differential is detected between atmospheric gas pressure in the first segment and atmospheric gas pressure in the second segment.

20. The method of claim 19 wherein the step of isolating the first segment is performed when the detected pressure differential is between about 0.04 psia and 0.08 psia.

21. The method of claim 19 which comprises a further step of producing a vehicle-wide warning signal when the detected pressure differential increases at a rate that exceeds about 0.1 psia per minute.

22. The method of claim 19 wherein the step of isolating the first segment occurs within a period of time that is between about 4 and about 10 minutes after the detected pressure differential reaches about 0.04 psia without exceeding a rate of increase in excess of about 0.1 psia per minute.

23. The method of claim 19 wherein:

a vehicle-wide warning signal is produced when the detected pressure differential increases at a rate that exceeds about 0.1 psia per minute;

the isolation barriers remain open during production of the vehicle-wide warning signal; and the isolation barriers are closed after personnel are no longer in the leaking segment.

24. The method of claim 19 wherein the step of isolating the segments from one another is performed only when a rate of change of the atmospheric gas pressure differential is less than about 0.1 psia per minute.

25. The method of claim 19 wherein the step of isolating the segments from one another is performed after the atmospheric gas pressure differential is greater than about 0.04 psia and a rate of change of the atmospheric gas pressure differential is less than about 0.1 psia per minute.

* * * * *

UNITED STATES PATENT AND TRADEMARK OFFICE
CERTIFICATE OF CORRECTION

PATENT NO.       : 7,600,525 B2                                           Page 1 of 1
APPLICATION NO. : 11/227694
DATED            : October 13, 2009
INVENTOR(S)      : Leimkuehler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 988 days.

Signed and Sealed this

Fifth Day of October, 2010

David J. Kappos
*Director of the United States Patent and Trademark Office*